(12) United States Patent
Chojecki et al.

(10) Patent No.: US 11,370,603 B2
(45) Date of Patent: Jun. 28, 2022

(54) REFUSE CONTAINER HAVING INTEGRATED SIGNAGE ASSEMBLY

(71) Applicant: Wastequip, LLC, Charlotte, NC (US)

(72) Inventors: Douglas Alan Chojecki, San Antonio, TX (US); Martin Damon Bryant, Mint Hill, NC (US); Brett Philip Withers, New Braunfels, TX (US)

(73) Assignee: Wastequip, LLC, Charlotte, NC (US)

( * ) Notice: Subject to any disclaimer, the term of this patent is extended or adjusted under 35 U.S.C. 154(b) by 378 days.

(21) Appl. No.: 16/398,348

(22) Filed: Apr. 30, 2019

(65) Prior Publication Data
US 2020/0346850 A1 Nov. 5, 2020

(51) Int. Cl.
*B65D 88/12* (2006.01)
*B65D 90/02* (2019.01)
*B60P 1/64* (2006.01)

(52) U.S. Cl.
CPC .......... *B65D 88/123* (2013.01); *B60P 1/6418* (2013.01); *B65D 90/02* (2013.01)

(58) Field of Classification Search
CPC .. B65D 25/205; B65D 88/121; B65D 88/122; B65D 88/123; B65D 88/124; B65D 88/125; B65D 88/126; B65D 2203/00; B65F 1/1484; B65F 2210/15; B65F 2220/101; B60P 1/6418
See application file for complete search history.

(56) References Cited

U.S. PATENT DOCUMENTS

| | | | |
|---|---|---|---|
| 3,803,738 A * | 4/1974 | Weiss | G09F 23/00 40/306 |
| 5,088,875 A | 2/1992 | Galbreath et al. | |
| 5,531,559 A | 7/1996 | Kruzick | |
| 5,542,807 A | 8/1996 | Kruzick | |
| 5,884,794 A * | 3/1999 | Calhoun | B65D 88/121 220/1.5 |
| 7,789,256 B2 | 9/2010 | Petzitillo, Jr. et al. | |
| 9,446,656 B2 | 9/2016 | Alder | |
| 9,896,013 B2 | 2/2018 | Franiak et al. | |
| 10,144,583 B2 | 12/2018 | Monaco et al. | |

OTHER PUBLICATIONS

Supplement to Information Disclosure Statement dated Aug. 29, 2019, all enclosed pages cited.

* cited by examiner

*Primary Examiner* — Andrew T Kirsch
(74) *Attorney, Agent, or Firm* — Nelson Mullins Riley & Scarborough, LLP

(57) ABSTRACT

A container including vertical side walls and a horizontal bottom wall coupled with the vertical side walls to define an interior volume. At least one vertical side wall includes an inner wall, a spaced apart outer wall, a top rail coupled with the inner wall, a bottom sill coupled with the inner wall, and a plurality of vertical supports coupled with the inner wall and extending between the top rail and the bottom sill. The inner wall has a first surface area and the outer wall portion has a second surface area that is less than the first surface area. A frame is coupled with the inner wall and supports the outer wall and extends between two of the plurality of vertical supports, the top rail, and the bottom sill. A panel is supported by the frame and disposed on the outer wall.

25 Claims, 16 Drawing Sheets

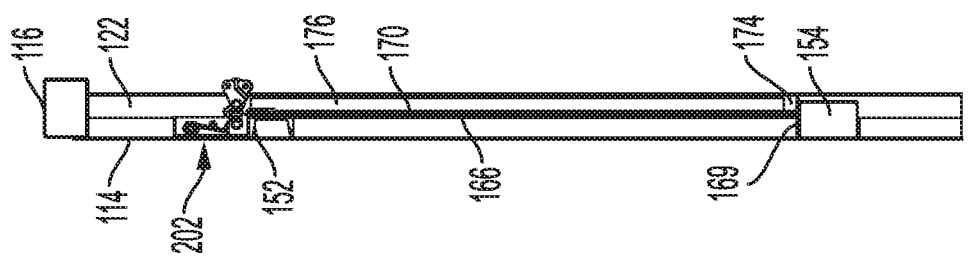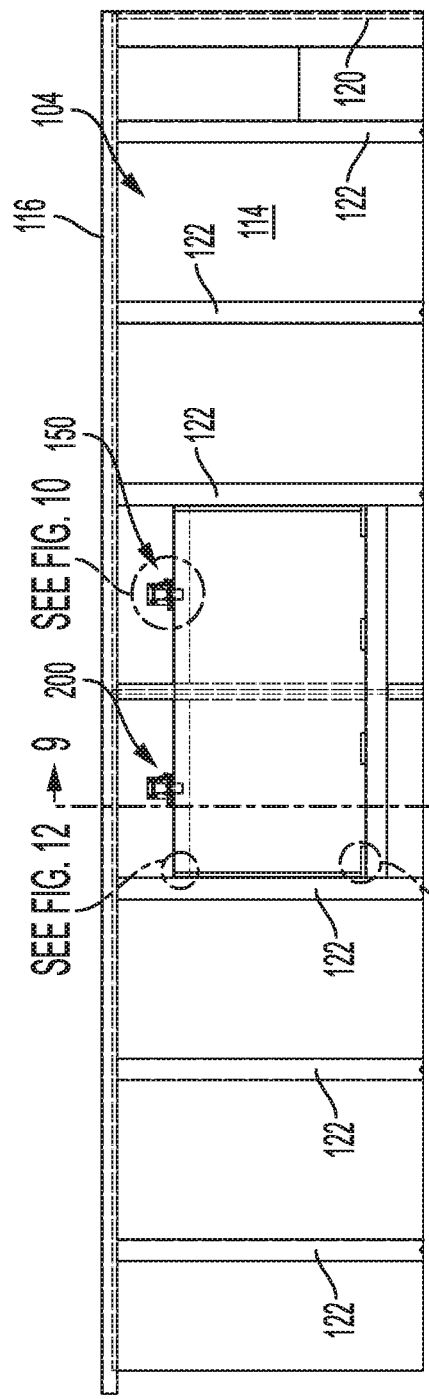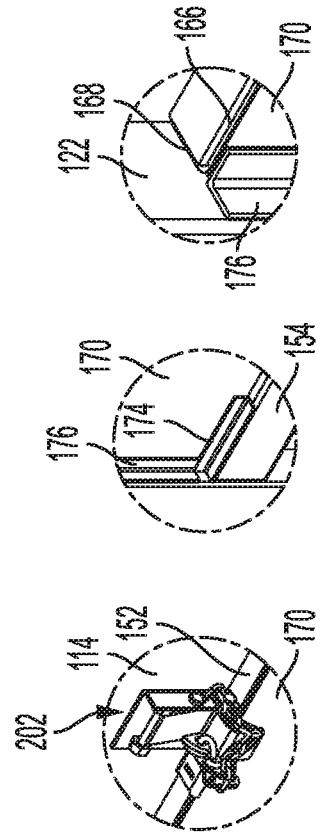

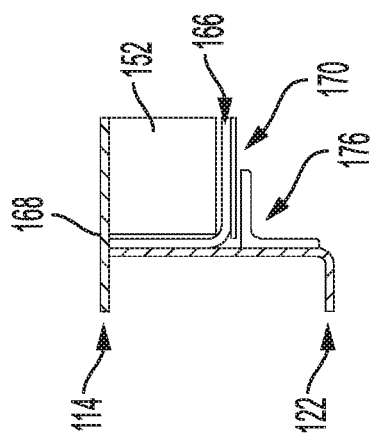
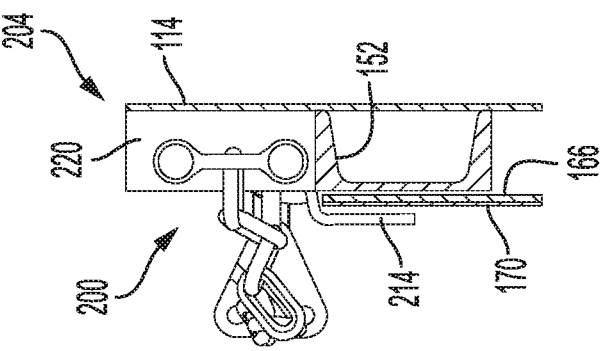
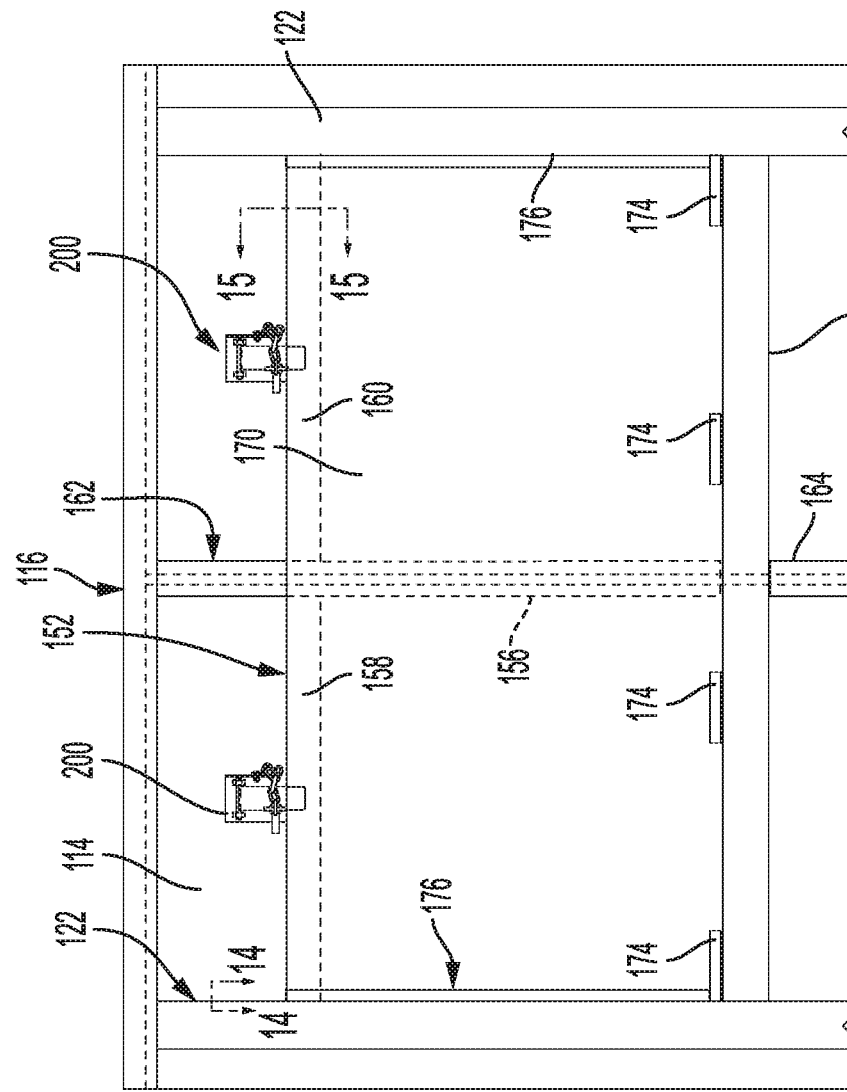

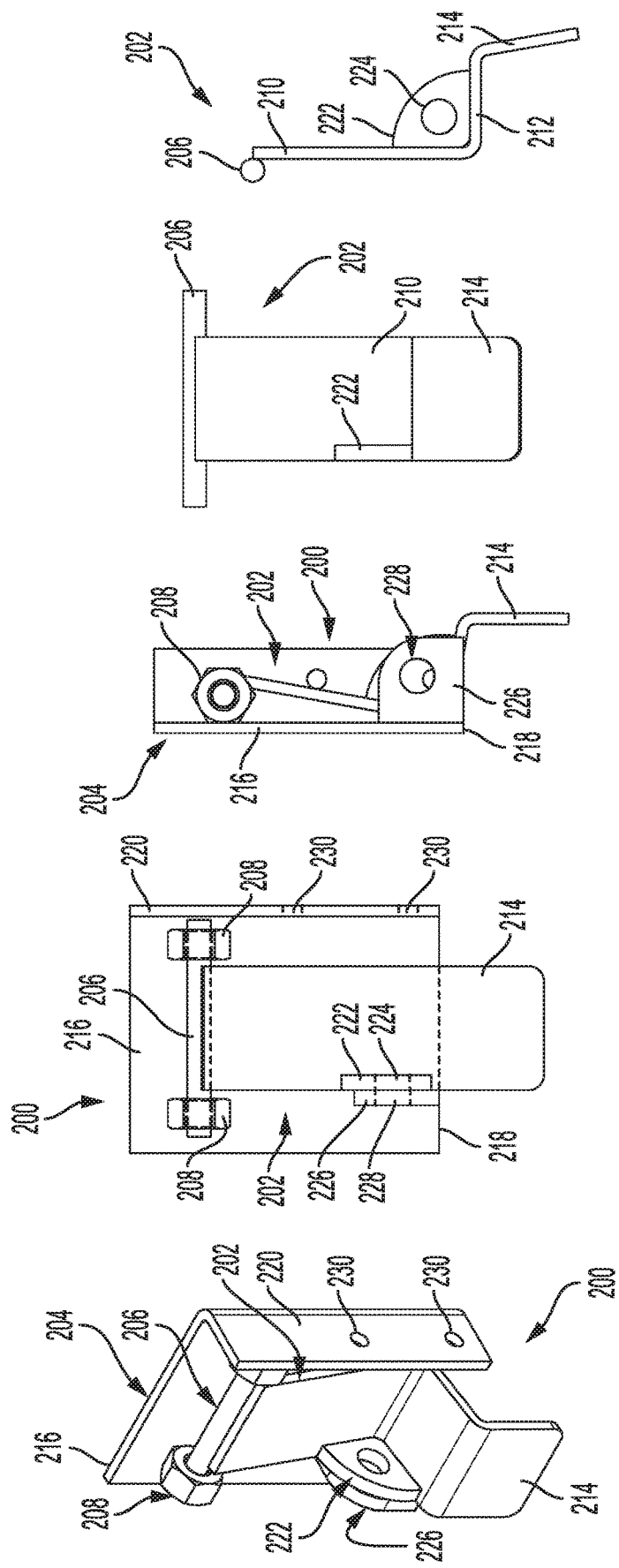

REFUSE CONTAINER HAVING INTEGRATED SIGNAGE ASSEMBLY

TECHNICAL FIELD

Embodiments of the present invention generally relate to the field of material-hauling containers. More particularly, certain embodiments of the present invention relate to improved refuse containers, including but not limited to roll-off dumpsters, having an integrated assembly for receiving and/or supporting various indicia, such as but not limited to signage. Among other things, the indicia is protected against internal and external damage, and the structure at least maintains the bending strength and/or structural integrity of such containers.

BACKGROUND

In the waste and materials hauling industry, a variety of containers are used to collect, transport, and/or dump waste, bulk, and liquid materials, among others. Such containers typically are carried on vehicles, such as trucks, or on trailers. The vehicle or trailer is provided with a hoist apparatus to load a container onto and unload the container from the vehicle or trailer, transport the container, and empty the container. Examples of hoist apparatuses include hook hoists, cable hoists, winches, forklifts, and container handlers. The containers loaded and carried by hoist apparatuses may be very heavy, especially when filled. Accordingly, and for example, hoist apparatuses may be rated for a container capacity of 20,000 or 30,000 lbs. Heavier duty hoist apparatuses can be rated for more than 30,000 lbs., in some cases up to 75,000 lbs. or greater.

One type of refuse container is known as a "roll-off container." Roll-off containers can be used in a variety of demanding waste applications, including scrap collection, construction and remodeling, demolition, and industrial clean-up, among others. Roll-off containers are usually designated by the volume of material they can contain, such as 20, 30, or 40 cubic yards.

Two common types of roll-off containers are rectangular, open top roll-offs and "tub-style" roll offs. The latter style of roll-off container has smooth sides and may be stackable for transporting and storage. FIGS. 1-2 are perspective views of the former style of roll-off container, a rectangular, open top roll-off container 10. Container 10 includes a body 12 including walls 14 and a door 16 provided on hinges at one end thereof to facilitate access to the interior volume of container 10. Container 10 is made out of a suitable metal material, such as steel. Walls 14 can be fabricated from steel, and a floor plate of container 10 (not shown) can be made from 7 gauge steel, for example. Also, walls 14 are reinforced by a plurality of vertical supports 18 which extend between a top rail 20 and a bottom sill 22 of container 10. Also, container 10 typically includes at least one set of wheels 24 to allow container 10 to be rolled in place and onto and off of a truck frame via a hoist apparatus. In FIGS. 1-2, two sets of wheels 24 are provided. Container 10 also may include a pair of main rails 26 used to provide support for heavy refuse and to facilitate placement of container 10 on the truck frame.

As shown in FIG. 3, a vehicle 30 equipped with a cable hoist has a cab 32 and is configured to support a roll-off container 34 on a sub-frame of the cable hoist pivotably connected with vehicle frame 36. A covering apparatus 38 is provided to extend and retract a cover over the top of container 34, as is well understood. Vehicle 30 is used for loading, unloading, transporting, and dumping container 34. For example, the sub-frame of the cable hoist can be elevated and lowered relative to vehicle frame 36 using hydraulic cylinders, as is also well known. When the sub-frame is elevated to an inclined position, it may serve as a ramp upon which container 34 may be pulled or slid onto and off of the hoist apparatus, for instance using a cable winch system to draw container 34 upward. Container 34 may also be dumped when the sub-frame is in the inclined position. When container 34 is suitably secured on the sub-frame, the sub-frame may be lowered into the position shown in FIG. 3 for transport. Those of skill in the art will appreciate that other types of hoist apparatuses may be used to load, unload, transport, and dump roll-off container 34, such as a vehicle equipped with a hook hoist. Additional background regarding vehicle mounted hook hoists is provided in U.S. Pat. Nos. 5,542,807; 5,531,559; and 5,088,875, the entire disclosures of which are incorporated herein by reference for all purposes.

The foregoing discussion is intended only to illustrate various aspects of the related art in the field of the invention at the time, and should not be taken as a disavowal of claim scope.

SUMMARY

Some example embodiments comprise apparatus and methods for providing a signage area on a refuse container. In various embodiments, the refuse container may comprise a roll-off container, intermodal container, or any suitable dump body, among others. The signage area may be supported by a frame coupled with at least one wall of the refuse container. In various embodiments, at least one wall of the refuse container may comprise a double-wall, at least in the signage area. In other words, in some embodiments, portions of at least one wall of the refuse container may be single-walled, and at least one portion of the at least one wall may be double-walled. Additionally, various embodiments maintain or increase the bending strength and structural integrity of the at least one wall via the double-walled portion. Various embodiments preferably provide structure permitting a replaceable panel to be received over the double-walled portion. The replaceable panel may bear indicia corresponding to advertising, branding, logos, or the like.

According to one embodiment, the present invention provides a container. The container comprises a first side wall, a second side wall opposite the first side wall, a front wall coupled with the first and second side walls, a rear wall opposite the front wall and coupled with at least one of the first and second side walls, and a bottom wall coupled with at least the first and second side walls and the front wall. The first side wall, second side wall, front wall, rear wall, and bottom wall together define an interior volume. A plurality of vertical supports comprise at least a first vertical support and a second vertical support that are spaced apart along an exterior surface of at least one of the first side wall, second side wall, and front wall. A frame is coupled with the exterior surface. The frame comprises a first horizontal frame member, the first horizontal frame member extending between the first and second vertical supports, and a second horizontal frame member spaced apart from the first horizontal frame member, the second horizontal frame member extending between the first and second vertical supports. The frame also comprises at least one rib extending along the exterior surface between the first and second horizontal frame members. An area is bounded by the first and second horizontal frame members and the first and second vertical supports. Further, the frame comprises a plate spaced apart from the exterior surface and extending across the area.

In yet another embodiment, the present invention provides a container. The container comprises first, second, and third side walls and an open end. A bottom wall is coupled with the first, second, and third side walls, and a door is pivotably coupled to the container and movable between a first position at which the door is spaced apart from the at least one open end and a second position at which the door closes the at least one open end. The first side wall comprises a plurality of vertical supports disposed on an exterior thereof. A frame is disposed between a first vertical support and a second vertical support of the plurality of vertical supports. A plate is coupled with the frame, the plate being parallel with and spaced apart from the exterior of the first side wall. A panel is removably coupled with the frame, the panel being parallel with the plate and covering at least a portion thereof.

According to a further embodiment, the present invention provides a container comprising vertical side walls and a horizontal bottom wall coupled with the vertical side walls, the vertical side walls and bottom wall together defining an interior volume. At least one vertical side wall comprises an inner wall portion, an outer wall portion spaced apart from the inner wall portion, a top rail coupled with the inner wall portion, a bottom sill coupled with the inner wall portion, and a plurality of vertical supports coupled with the inner wall portion and extending between the top rail and the bottom sill. The inner wall portion has a first surface area and the outer wall portion has a second surface area that is less than the first surface area. A frame is coupled with the inner wall portion and supports the outer wall portion, and the frame extends between two spaced apart vertical supports of the plurality of vertical supports, the top rail, and the bottom sill. A panel is supported by the frame and disposed on the outer wall portion.

BRIEF DESCRIPTION OF THE DRAWINGS

Figure 1:
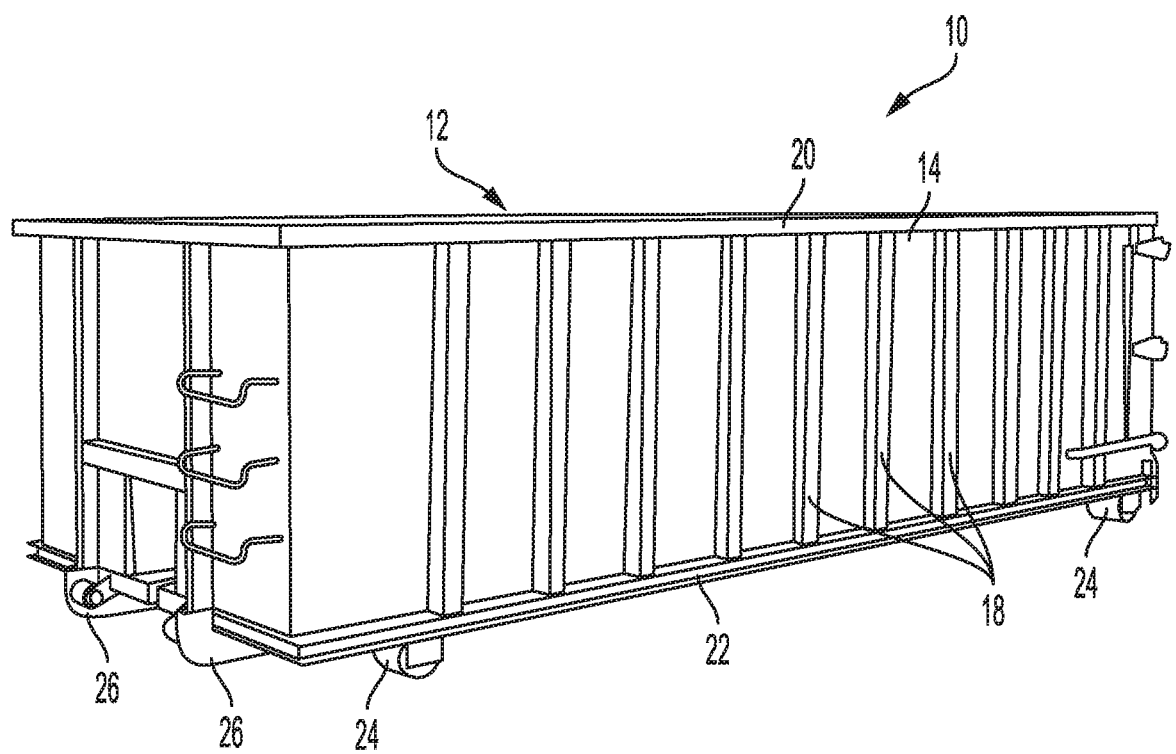
Figure 2:
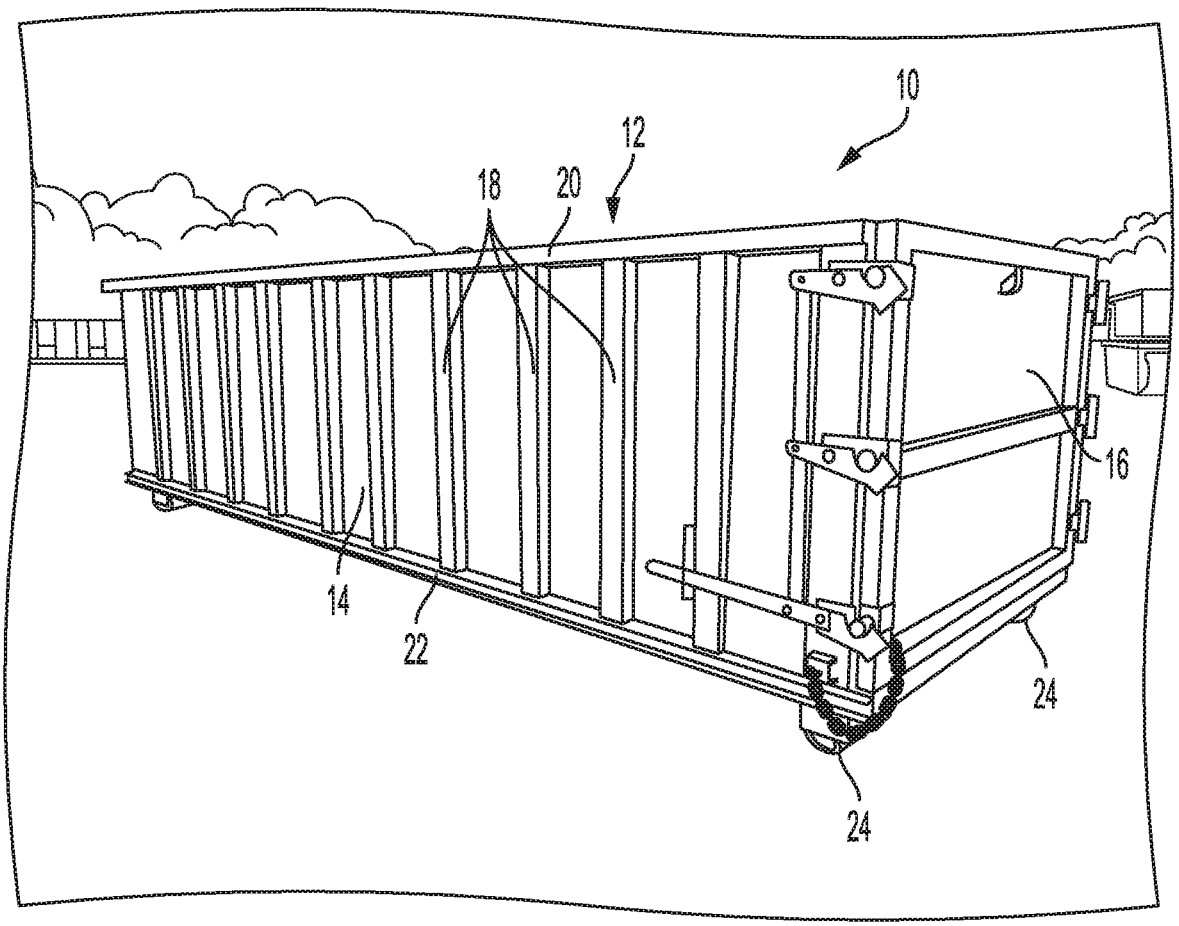
Figure 3:
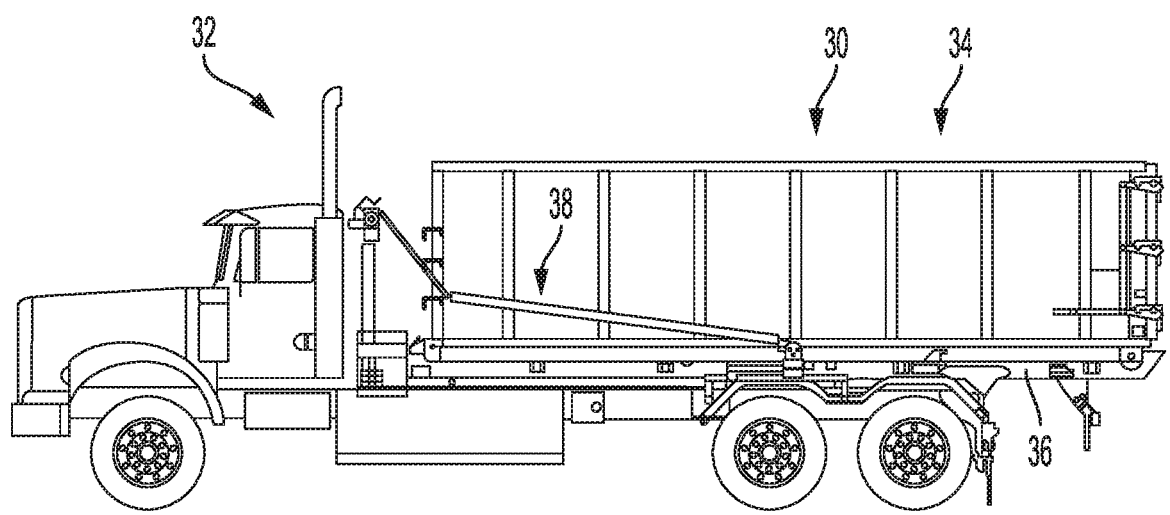
Figure 6:
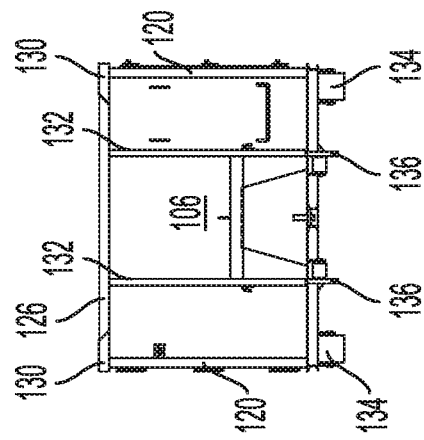
Figure 7:
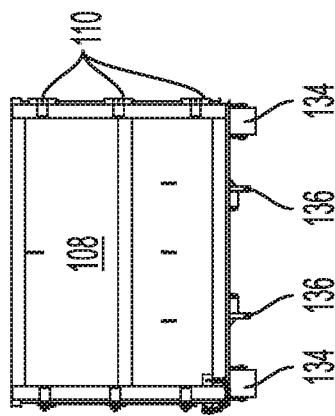
Figure 4:
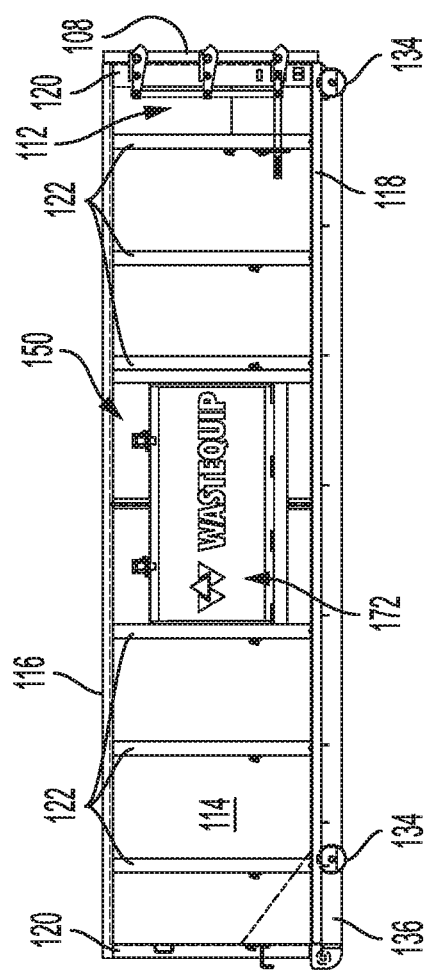
Figure 5:
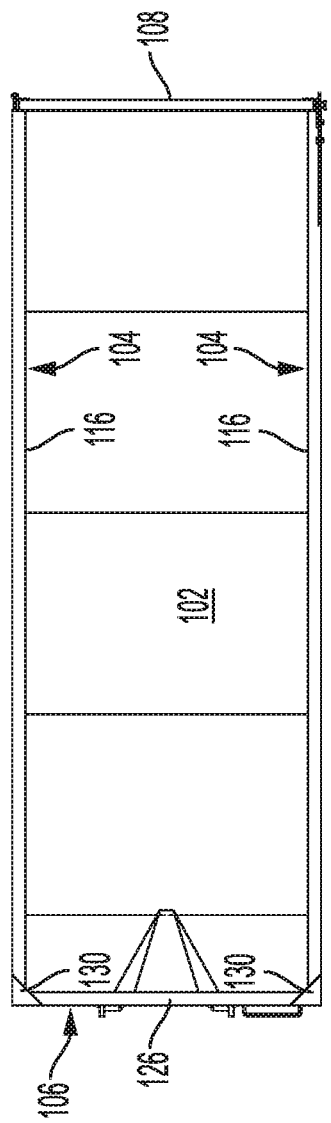
Figure 16:
Figure 17:
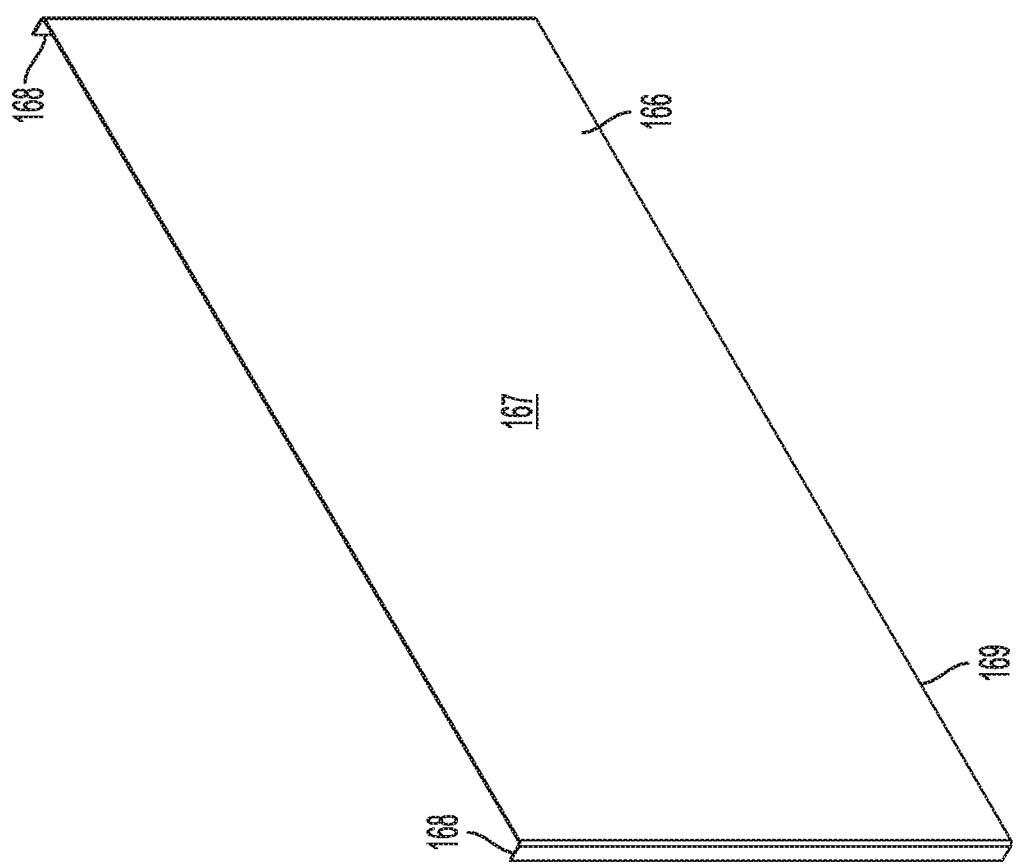
Figure 18:
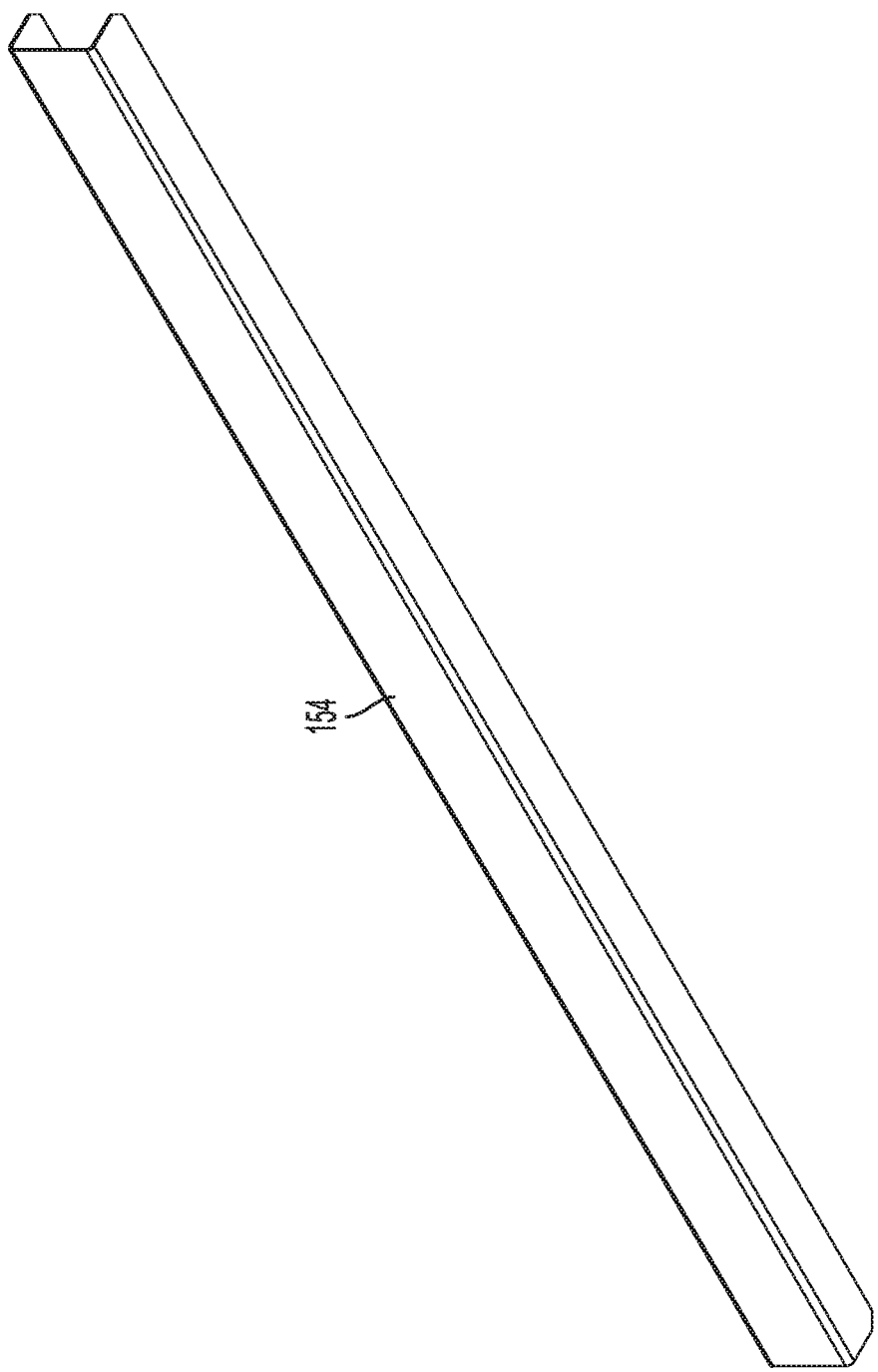
Figure 24:
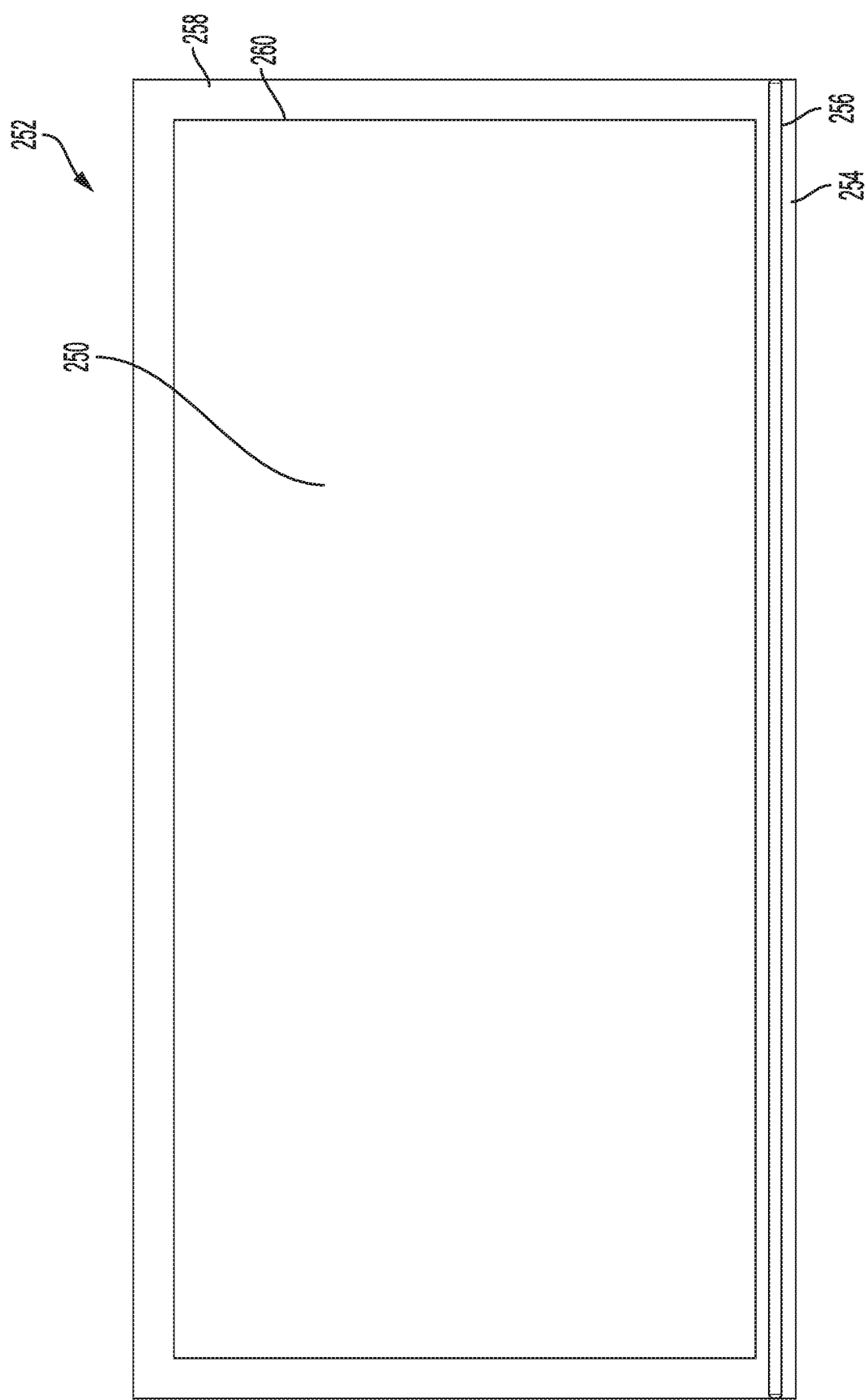

Having thus described some example embodiments in general terms, reference will now be made to the accompanying drawings, which are not necessarily drawn to scale, and wherein:

FIGS. 1-2 are perspective views of a prior art roll-off container;

FIG. 3 is a schematic elevation view of a roll-off container carried on a truck having a hoist apparatus;

FIG. 4 is a side elevation view of a container of according to an embodiment of the present invention;

FIG. 5 is a plan view of the container of FIG. 4;

FIG. 6 is a front elevation view of the container of FIG. 4;

FIG. 7 is a rear elevation view of the container of FIG. 4;

FIG. 8 is a partial side view of the container of FIG. 4;

FIG. 9 is a cross-sectional view taken along the line 9-9 in FIG. 8;

FIG. 10 is a detail perspective view of a retainer assembly coupled with the container of FIG. 8;

FIG. 11 is a detail perspective view of a portion of the container of FIG. 8;

FIG. 12 is a detail perspective view of a portion of the container of FIG. 8;

FIG. 13 is a partial side view of the container of FIG. 4;

FIG. 14 is a cross-sectional view taken along the line 14-14 in FIG. 13;

FIG. 15 is a cross-sectional view taken along the line 15-15 in FIG. 13;

FIG. 16 is a side view of a sign panel that may be used with embodiments of the present invention;

FIG. 17 is a perspective view of the plate of the container of FIG. 4;

FIG. 18 is a perspective view of a horizontal frame member of the container of FIG. 4;

FIG. 19 is a perspective view of a retainer assembly that may be used in embodiments of the present invention;

FIG. 20 is an elevation view of the retainer assembly of FIG. 19;

FIG. 21 is a side view of the retainer assembly of FIG. 19;

FIG. 22 is an elevation view of the hasp of the retainer assembly of FIG. 19;

FIG. 23 is a side view of the hasp of FIG. 22;

FIG. 24 is a schematic side view of a panel disposed in a pivotable housing according to another embodiment of the present invention.

Figure 25:
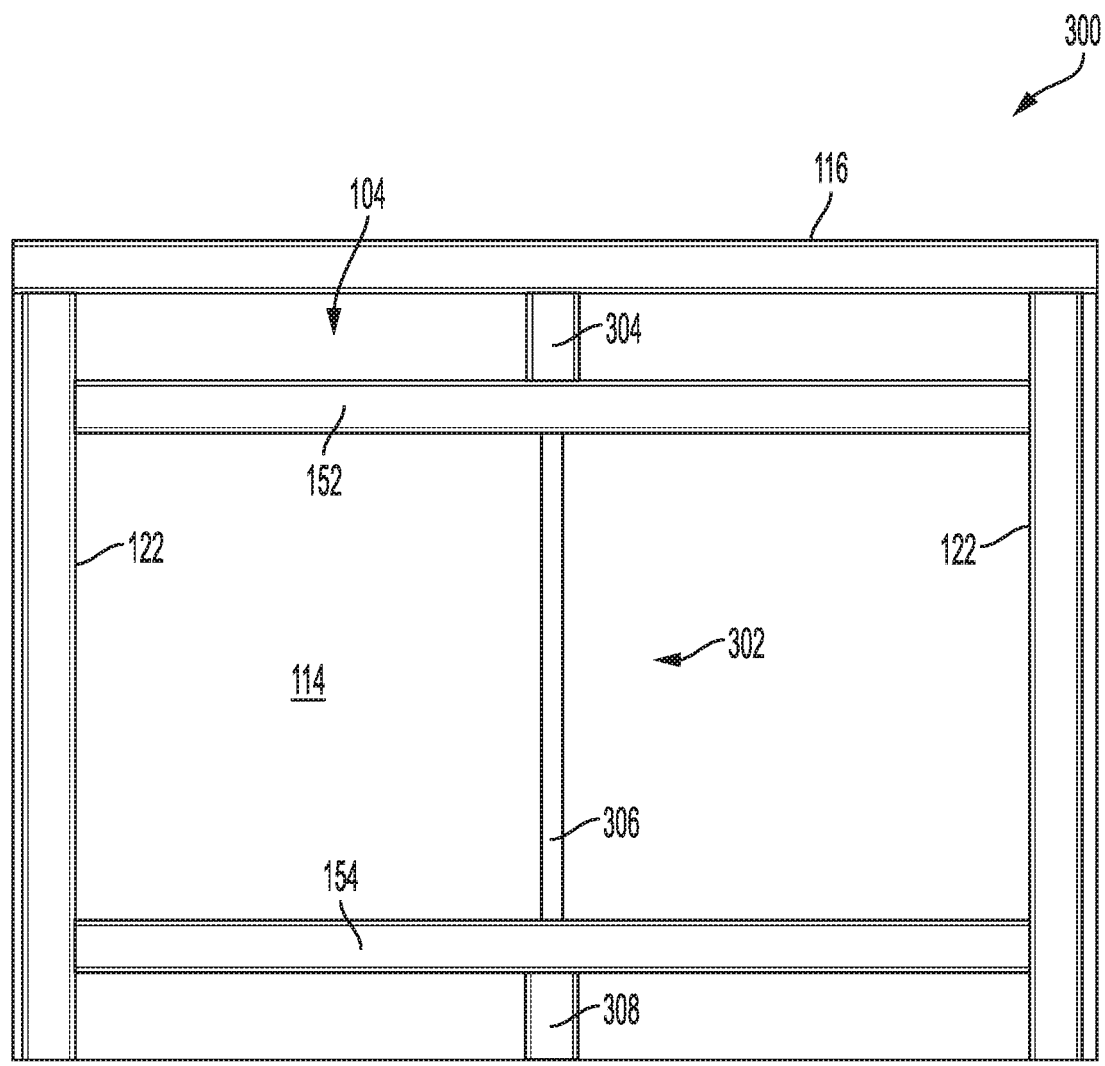
Figure 26:
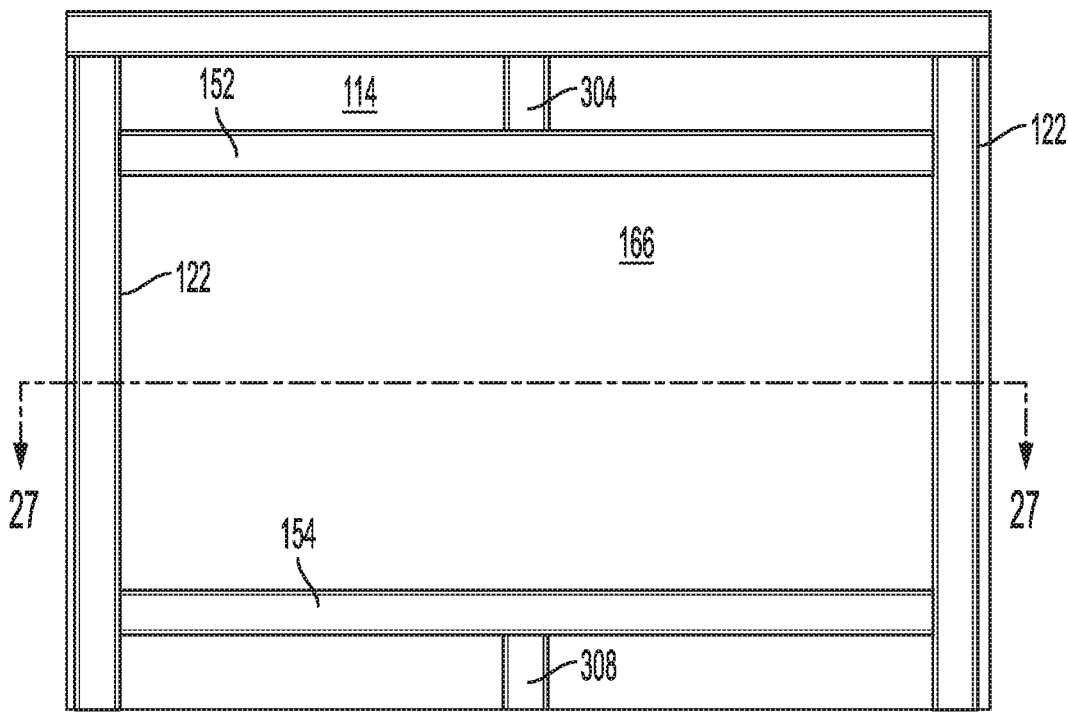
Figure 27:
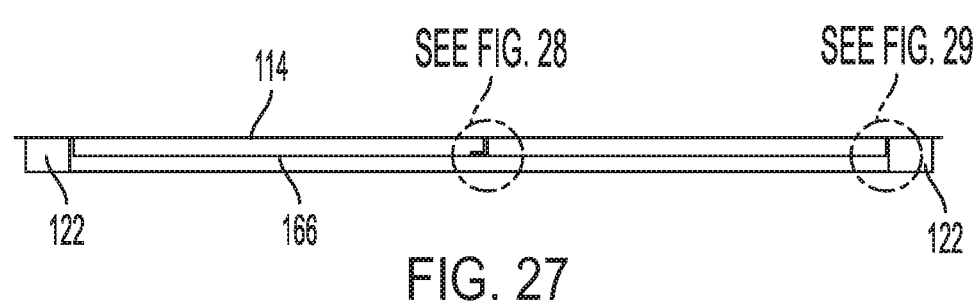
Figure 28:
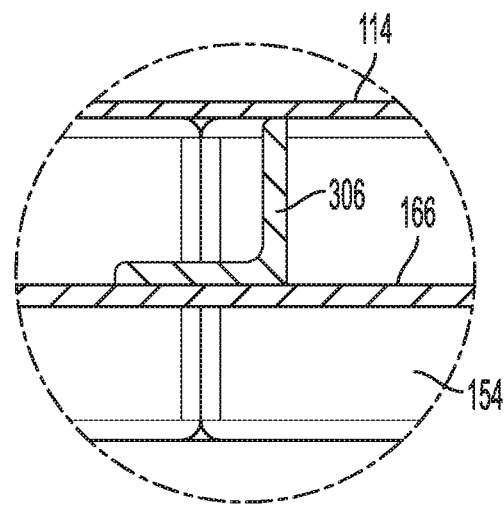
Figure 29:
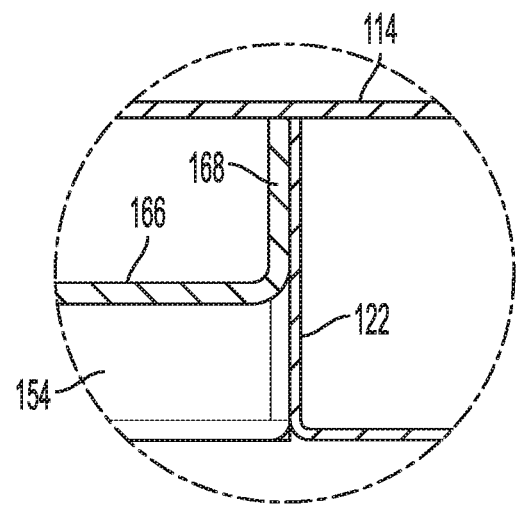
Figure 30:
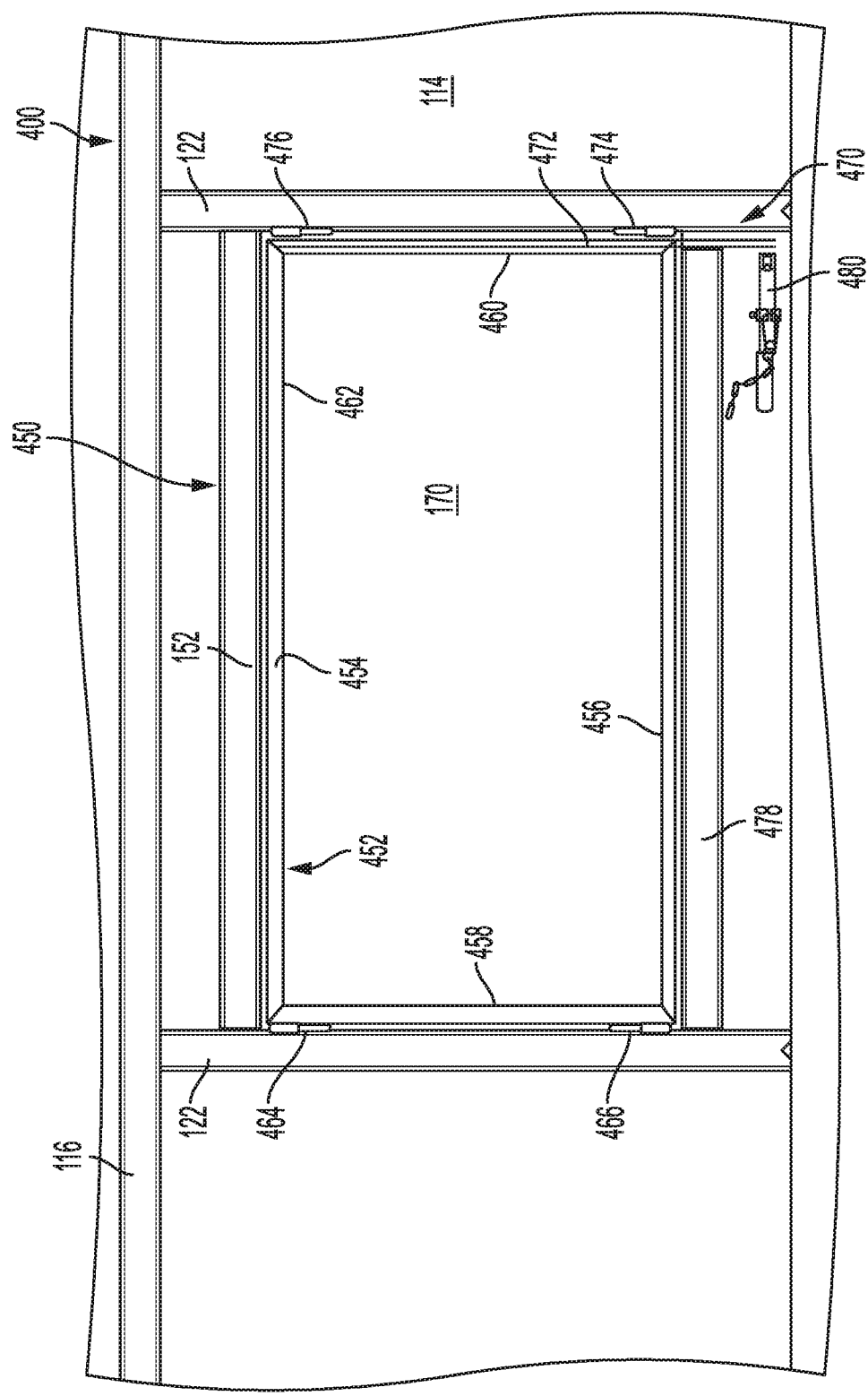
Figure 31:
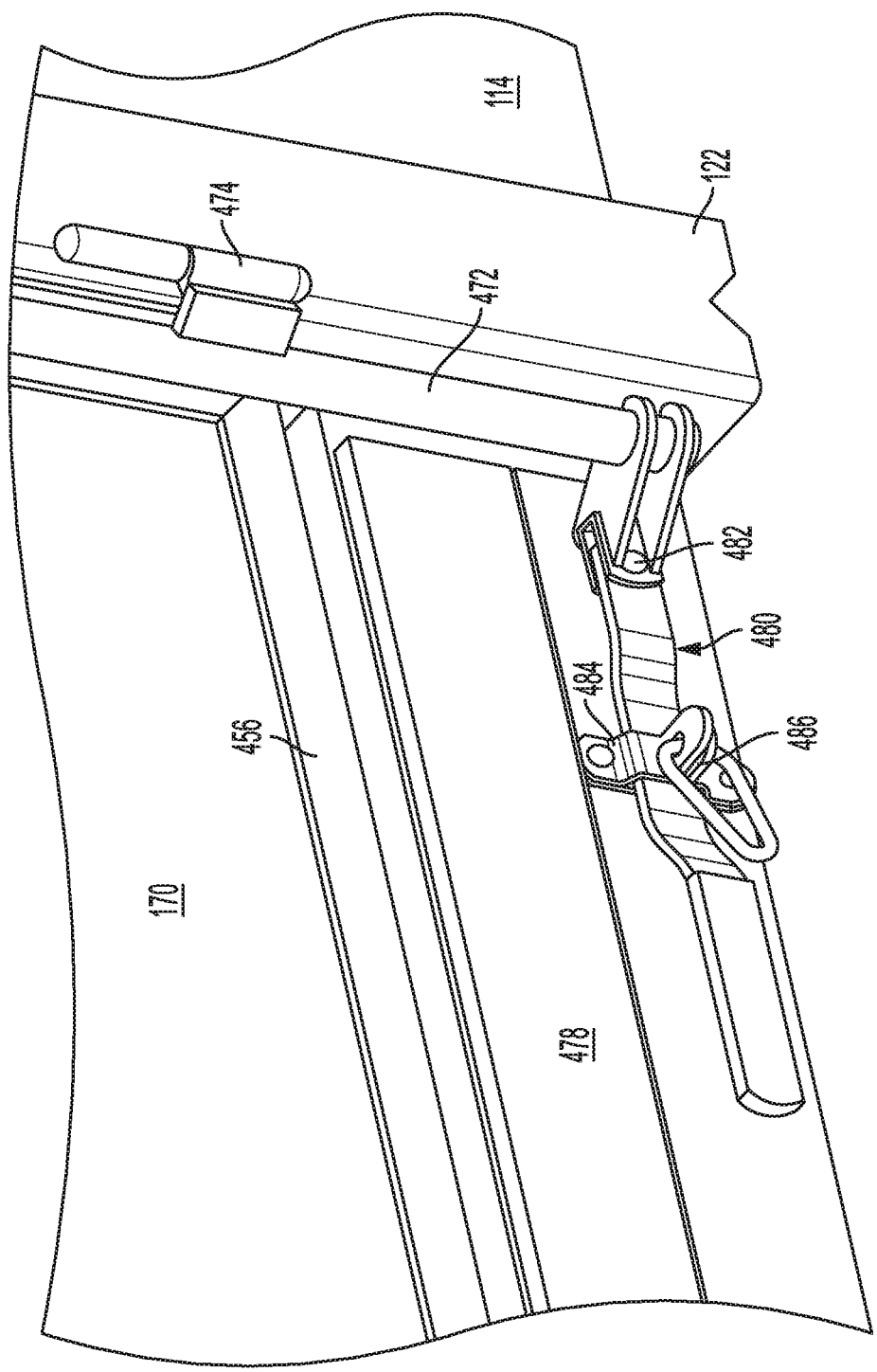
Figure 32:
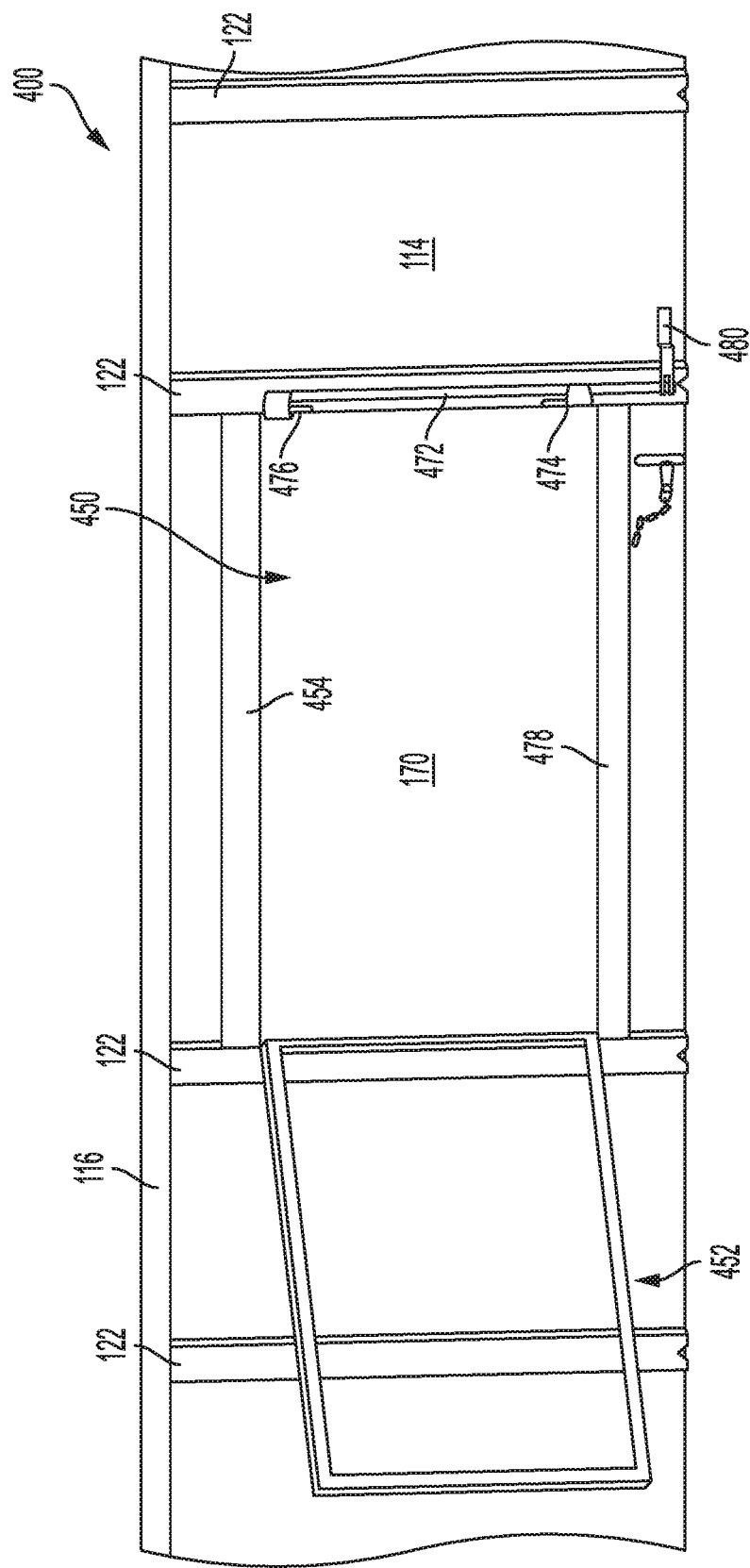

FIGS. 25 and 26 are detail side views of a refuse container according to another embodiment of the present invention, without and with a plate coupled thereto;

FIG. 27 is a cross-sectional view taken along the line 27-27 in FIG. 26;

FIG. 28 is a detail view of a portion of the refuse container of FIG. 26;

FIG. 29 is a detail view of a portion of the refuse container of FIG. 26;

FIG. 30 is a partial side view of a container according to another embodiment of the present invention;

FIG. 31 is a detail perspective view of a portion of the retainer assembly of the container of FIG. 30; and FIG. 32 is a partial side view of the container of FIG. 30 wherein a border plate for a removable panel is moved to the open position.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of a container, such as but not limited to "vertical," "horizontal," "upper," "lower," "front," or "rear," refer to directions and relative positions with respect to the container's orientation in its normal intended operation, as indicated in the Figures herein. Thus, for instance, the terms "vertical" and "upper" refer to the vertical direction and relative upper position in the perspectives of the Figures and should be understood in that context, even with respect to an apparatus that may be disposed in a different orientation. The term "substantially," as used herein, should be interpreted as "nearly" or "close to", such as to account for design and manufacturing tolerances of the apparatus.

Roll-off containers are currently available from a number of companies, such as Wastequip LLC of Charlotte, N.C. Examples of roll-off containers that may be modified and/or manufactured in accordance with embodiments of the present invention may be analogous to the 20, 30, and/or 40 cubic yard rectangular open-top roll-off dumpsters offered by Wastequip and other manufacturers. Those of skill in the art are familiar with such containers and those of other manufacturers, which accordingly are not described in further detail herein.

Although there have been attempts to provide various indicia (as used herein, including signage, logos, advertisements, or the like) on refuse containers in the past, these attempts suffer from a number of drawbacks. For instance, indicia can be applied directly to (i.e., painted on or adhered to) the walls of a rectangular or a tub-style roll-off container. As described above, however, known roll-off containers typically comprise only single walls, for instance made of 7 or 12 gauge steel. As a result, such indicia is subject to damage and defacement caused by debris inside the container impacting and deforming the wall surface. Moreover, the vertically extending supports of rectangular roll-offs may limit the area in which indicia can be applied, may make indicia more difficult to apply, and may make indicia more difficult to be seen and read. Also, removal and or modification of such indicia is necessarily labor intensive.

It is also known to attach (e.g., weld) a flat piece of metal including indicia across two or more vertical supports of a roll-off container. Such an approach, however, still leaves the unprotected indicia on the flat metal piece subject to damage from sources exterior to the container. For instance, debris or material handling equipment commonly strike the exterior of a refuse container. Because the flat metal piece is not supported from behind and instead only extends over two or more vertical supports, the flat metal piece is easily dented and damaged.

Further, it is known to remove at least a portion of one or more of the vertical supports on a roll-off container (or to not include one of the vertical supports during manufacture) in order to define a larger area on the side wall where indicia is applied. A pair of spaced apart, horizontal beams may be coupled with the exterior surface of the side wall to define the upper and lower boundaries of the area for indicia. In this case, however, the indicia applied in such an area remains subject to damage caused by debris inside the container impacting and deforming the wall surface. Additionally, removing (or not including) all or a portion of a vertical support reduces the bending strength of the container walls and lessens the structural integrity of the container. Although a "sign box" can be coupled directly to the vertical supports of a container side-wall without removing one of the vertical supports, doing so is undesirable. In this regard, the overall container width likely would exceed the width permitted by applicable regulations (e.g., regulations promulgated by the DOT), or require the container to be made narrower, thereby reducing its available volume.

Accordingly, embodiments of the present invention relate to improved systems and methods for providing indicia on a refuse container. As described in more detail below, embodiments of the present invention maintain the structural integrity of a roll-off container without significantly adding to the overall weight and/or width of the container. Additionally, embodiments of the present invention protect the indicia from both exterior- and interior-induced damage.

Further, in various embodiments, a roll-off container is provided with indicia that is easily and quickly replaceable.

Although some preferred embodiments are discussed below in the context of rectangular, open-topped roll-off containers, those of skill in the art will appreciate that the present invention is not so limited. In particular, it is contemplated that embodiments of the present invention may be used with any suitable waste, refuse, or payload container, such as but not limited to tub-style roll-off containers, intermodal containers, and dump bodies.

Turning now to the figures, certain details of a container constructed in accordance with an embodiment of the present invention are described below with reference to FIGS. 4-18. In general, a container 100 may be a rectangular open-topped roll-off container comprising a bottom wall 102, two side walls 104 in facing opposition, a front wall 106, and a door 108. Bottom wall 102, side walls 104, front wall 106, and door 108 are coupled together to define an interior volume therein. Door 108 is coupled with one of side walls 104 in this embodiment via hinges 110, which permit door 108 to open and close the interior volume of container 100. A latching device 112 may be coupled to one of side walls 104 to latch door 108 in a closed position as is understood. As those of skill in the art will appreciate, a door 108 may not be provided in all embodiments, and instead a fixed rear wall could be coupled between side walls 104.

In one embodiment, each side wall 104 comprises a rectangular metal sheet 114, for example formed of 12 gauge or 7 gauge steel. Top rails 116 may be coupled with and extend horizontally along an upper edge of sheets 114. In various embodiments, top rails 116 may comprise rectangular metal tubing welded to sheets 114. The lower edge of sheets 114 may be coupled with bottom sills 118, which are also preferably coupled with bottom wall 102. Corner posts 120 may be coupled with the lateral edges of sheets 114 and extend between top rails 116 and bottom wall 102. A plurality of vertical supports 122 preferably are coupled with sheets 114 and extend vertically between top rails 116 and bottom sills 118. As will be appreciated, vertical supports 122 may stiffen walls 104 and increase the bending strength thereof.

Similarly, front wall 106 may comprise a rectangular metal sheet 124 that extends vertically between a top rail 126 and bottom sills 128 coupled with respective upper and lower edges thereof. Metal sheet 124 also extends laterally between corner posts 120. Bottom sills 128 may also be coupled with bottom wall 102. Corner wraps 130 may be provided between top rails 116 and top rail 126 for added strength. Also, one or more vertical supports 132 may extend vertically between top rail 126 and bottom sills 128 to stiffen or otherwise provide support to front wall 106.

As with container 10 described above, in various embodiments container 100 may also comprise at least two wheels 134. In the illustrated embodiment, four such wheels 134 are provided. A substructure of container 100 may comprise a pair of longitudinal rails 136 which extend generally along the length thereof and which may provide support for bottom wall 102 and facilitate loading, unloading, and transport of container 100 on a hoist frame.

Container 100 comprises an integrated assembly 150 for receiving and/or supporting signage or other indicia. In various embodiments, assembly 150 may comprise a frame coupled with one or more of walls 104, 106, and/or door 108 of container 100. Further, in various embodiments, assembly 150 may comprise an outer wall portion parallel with and spaced apart from walls 104, 106, and/or door 108, and allow for the provision of a removable panel bearing indicia thereon. In some embodiments, a container 100 may comprise more than one assembly 150 on one or more walls thereof.

Assembly 150 in the illustrated embodiment is coupled with a side wall 104 and comprises an upper frame member 152 coupled with metal sheet 114 and a lower frame member 154 (FIG. 18) coupled with metal sheet 114. As best seen in FIGS. 8-9 and 13, upper and lower frame members 152, 154 may be generally parallel and spaced apart from one another and may extend horizontally between two vertical supports 122. Frame members 152, 154 comprise metal channels in this embodiment, but may also comprise metal tubing of any cross-section in other embodiments. In some embodiments, at least lower frame member 154 may be formed by bending a suitably-dimensioned steel sheet (e.g., formed of 12 gauge steel). Also, as shown in FIG. 9, in this embodiment, the depth of lower frame member 154 may be greater than the depth of upper frame member 152, as discussed in more detail below. Frame members 152, 154 may be welded to metal sheet 114 in one embodiment or attached thereto using suitable fasteners.

In prior art containers, a vertically-extending support 122 would typically be coupled with side wall 104 in the place where assembly 150 is provided in the illustrated embodiment of container 100. As shown in FIG. 13, however, by providing assembly 150, at least one vertical support 122 must be either removed from (if assembly 150 is added as a "retrofit" component) or not provided during initial manufacture of container 100. To maintain (and, in some cases, increase) the bending strength of side wall 104 and overall structural integrity of container 100, assembly 150 in this embodiment may also comprise a rib 156. In various embodiments, rib 156 may extend vertically between top rail 116 and bottom sill 118 and comprise a length of metal channel, metal tubing, or the like. Rib 156 may be welded to metal sheet 114 or attached thereto using suitable fasteners. In some embodiments, rib 156 may extend parallel with vertical supports 122.

Depending on the configuration of assembly 150, any of frame members 152, 154 and/or rib 156 may comprise multiple individual pieces separated by other frame members and/or rib pieces. For instance, in the embodiment illustrated in FIG. 13, upper frame member 152 may comprise two frame members 158, 160 that are spaced on either side of rib 156. Likewise, in this embodiment, rib 156 may comprise multiple vertically-extending ribs 162, 164 spaced above and below lower frame member 154. Lower frame member 154 comprises a single piece of metal channel in this embodiment. Those of skill in the art will appreciate that many other configurations are contemplated and within the scope of the present invention. For example, in some embodiments, both upper and lower frame members 152, 154 may comprise single pieces of metal channel, and rib 156 may be broken into three pieces. Likewise, in some embodiments, both upper and lower frame members 152, 154 may be broken into two spaced apart metal channels, and rib 156 may be a single piece. Furthermore, in some embodiments, each of upper and lower frame members 152, 154 and rib 156 may be unitary pieces, with no "breaks" therein. This could be accomplished, for example, via apertures provided in upper and lower frame members 152, 154 or in rib 156.

Additionally, it will be appreciated that rib 156 need not extend vertically or be parallel with vertical supports 122 in all embodiments. In some embodiments, for example, rib 156 may extend at an angle to vertical supports 122, including at a right angle thereto. In other embodiments, rib 156 may be curved or bowed. In yet other embodiments, rib 156 may comprise two or more intersecting ribs, for example extending between vertical supports 122 in an "X" pattern or another suitable pattern.

As suggested above, via assembly 150, side wall 104 of container 100 may be double-walled along at least a portion thereof in some embodiments. In one example, assembly 150 preferably comprises a plate 166 (FIG. 17) coupled with container 100. As discussed in more detail below, plate 166 and frame members 152, 154, and rib 156 may comprise a frame operative to support a replaceable panel.

Plate 166 may extend generally between vertical supports 122 and upper and lower frame members 152, 154. Plate 166, which in one preferred embodiment may be formed from sheet steel, preferably comprises a body 167 and two flanges 168. Flanges 168, which may be formed on plate 166 by bending in one embodiment, extend along a plane perpendicular to the plane in which body 167 lies. Referring now to FIGS. 12 and 14 in particular, in this embodiment, a small gap is provided between upper frame member 152 and vertical supports 122 on each side of upper frame member 152. These gaps are sized to receive flanges 168 snugly therein, such that flanges 168 may be welded between vertical supports 122 and upper frame member 152 in one embodiment. In this manner, body 167 of plate 166 is spaced apart from metal sheet 114 of side wall 140. In this embodiment, flanges 168 are sized such that the body 167 of plate 166 is disposed against an outer face of upper frame member 152, though this is not required in all embodiments. A lower edge 169 of plate 166 is disposed on lower frame member 154 in this embodiment. Thus, in this embodiment, plate 166 extends from an upper surface of lower frame member 154 and, as best seen in FIGS. 12 and 15, to a position proximate the upper edge of upper frame member 152. Those of skill in the art will appreciate that plate 166 also provides additional strength to side wall 140 in this embodiment. In one preferred embodiment, plate 166 may be coupled with container 100 via welding, but suitable fasteners may also be used.

Again, many different configurations of plate 166 are within the scope of the present invention. In some embodiments, plate 166 may extend only between an upper surface of lower frame member 154 and a lower surface of upper frame member 152. In such embodiments, both upper and lower frame members 152, 154 may be in contact with vertical supports 122. In some embodiments, plate 166 need not be provided with flanges 168. Plate 166 may extend across both upper and lower frame members 152, 154 in some such embodiments. Also, in some embodiments, flanges 168 may be provided on the upper and lower edges of plate 166, rather than on its side edges.

In accordance with embodiments of the present invention, assembly 150 may also comprise a panel 170. In this embodiment, panel 170 is generally rectangular in shape and extends between vertical supports 122, upper frame member 152, and lower frame member 154. Panel 170 preferably is operative to bear indicia 172 thereon, as shown in FIG. 4. As best seen in FIGS. 9, 11-12, and 13-14, in this embodiment panel 170 is disposed over the exterior-facing surface of plate 166, with its side edges proximate vertical supports 122, its lower edge proximate the upper surface of lower frame member 154, and its upper edge proximate the upper surface of upper frame member 154. Because lower frame member 154 extends farther outward from the exterior surface of side wall 104 than upper frame member 152 in this embodiment, a lower edge of panel 170 may rest on the upper face of lower frame member 154. In preferred embodiments, panel 170 is formed from a lightweight metal material, such as aluminum, though it will be appreciated that panel 170 may be formed from any material suitable for use in the environments in which refuse containers are used, including plastic materials, and suitable for receiving desired indicia. Indicia 172 may be provided on panel 170 in any suitable manner, including painting, adhesives, or via fasteners.

In a preferred embodiment, panel 170 is removably coupled with container 100 and may be replaceable. Thus, for example, assembly 150 may define a slot to releasably retain panel 170 in place. With reference to FIGS. 9 and 11-14, in the illustrated embodiment, for example, assembly 150 comprises a plurality of angles 174 coupled with lower frame member 154. Again, because lower frame member 154 extends farther outward from the exterior surface of side wall 104 than upper frame member 152 in this embodiment, angles 174 may disposed on lower frame member 154 so as to allow a clearance between angles 174 and plate 166 sized to receive panel 170 therebetween. Additionally, assembly may comprise one or more angles 176 disposed on each of vertical supports 122. Angles 176 are disposed on vertical supports 122 so as to allow a clearance between angles 176 and plate 166 sized to receive panel 170 therebetween. In various embodiments, angles 174, 176 may be welded to lower frame member 154 and vertical supports 122, respectively, or attached thereto using any suitable method. Together, vertical supports 122, lower frame member 154, and angles 174 and 176 may define a slot into which panel 170 may be loaded and unloaded from a top end thereof. Thereby, panels 170 may be replaced as needed or desired, for instance to update the indicia with which container 100 is to be associated.

Panel 170 may be coupled with container 100 in a variety of other ways within the scope of the invention. For example, panel 170 may simply be removably attached to plate 166 using suitable fasteners, and a slot and/or angles 174, 176 may not be provided in all embodiments. In some embodiments, panel 170 could be adhered or magnetically attached to plate 166. In one embodiment, only one angle is provided, and in other embodiments, a plurality of angles are provided. In some embodiments, the slot may be formed by a unitary length of angled metal. Also, in other embodiments, the slot may be formed by rectangular flats, rather than angles. Those of skill in the art will appreciate that other configurations are contemplated. Further, in some embodiments, assembly 150 may comprise more than one slot and be configured to receive more than one panel.

The dimensions of the assembly 150 may vary according to the needs of the user of container 100 and the type and/or size of indicia to be provided. In one embodiment, however, and with respect to a standard 30-yard roll-off container, assembly 150 may be about 72" in width and provide space for a 37" tall panel. In general, though, the plate 166 of assembly 150 preferably has a smaller area than the area of side wall 104.

Based on the foregoing, it will be appreciated that in embodiments of the present invention, panel 170 (and any indicia 172 thereon) is protected from interior and exterior damage. In this regard, panel 170 is protected from damage caused by debris, etc., impacting and deforming the interior of side wall 104 because panel 170 is spaced apart from metal sheet 114 of side wall 104 via assembly 150. Also, panel 170 is protected from damage from exterior sources, such as by debris or material handling equipment. In this regard, and as best seen in FIG. 9, in this embodiment panel 170 is "recessed" with respect to vertical supports 122 and lower frame member 154. In other words, panel 170 may be framed by these members such that panel 170 is closer to the exterior surface of metal sheet 114 than are the outer faces of supports 122 and lower frame member 154. As a result, panel 170 may be less likely to be stricken or impacted by debris, equipment, or the like. Furthermore, plate 166 may provide additional support and strength to panel 170 in this embodiment. If panel 170 is impacted by debris, equipment, or the like, it may be less likely to be damaged, bent, and/or deformed due to the support provided by plate 166.

Additionally, embodiments of the present invention preserve and, in some cases, increase the bending strength of a wall of container 100. In this regard, the bending strength of side wall 104 including an embodiment of assembly 150 as compared to the side wall of a known container, such as a wall 14 of container 34 described above, can be calculated by modeling the wall section as a beam. In this regard, the maximum stress on the wall $S_w$ is given by:

$$S_w = M/Z$$

In this equation, M represents the bending moment (in-lb) on the section of interest, and Z represents the section modulus. Z is equal to I/c, where I is the area section inertia (in$^4$) about the centroid axis and c is the maximum distance from the centroid axis to the outer surface (in). If the section modulus Z in a container having an embodiment of assembly 150 is at least equal to the section modulus in a known container without an embodiment of assembly 150, then the stress in the wall of the container having an embodiment of assembly 150 will be the same or lower than the stress in the wall of the known container for the same applied bending moment.

Table 1 below presents data used to calculate the section modulus Z of a known container wall section. This wall section includes three vertical supports, each formed from 12 gauge steel (thickness 0.1046"), and a side wall also formed from 12 gauge steel (thickness 0.1046"). The side wall length is 80.375" in this example, yielding a cross-sectional area of 8.40723 in$^2$. The vertical supports in this example are metal channels with a height of 2.875" and a width of 4.188", yielding a cross-sectional area of 1.002 in$^2$. Thus, the total cross-sectional area is 11.4132 in$^2$. In Table 1, x is the distance from the inner surface of the side wall to its centroid, A refers to the cross-sectional area mentioned above, $D_{centroid}$ is the distance from the inner surface of the side wall to the centroid axis of the "beam," and c is the distance from the centroid axis of the "beam" to the outer surface of the vertical supports. Additionally, "SW" refers to the side wall, and "VS" refers to the vertical supports.

TABLE 1

Calculation of Section Modulus for Known Container Wall Section

|    | I (in$^4$) | x (in) | A*x (in$^3$) | $D_{centroid}$ (in) | $x_{centroid}$ (in) | $I_{centroid}$ (in$^4$) | c (in) | Z (in$^3$) |
|----|---|---|---|---|---|---|---|---|
| SW | 0.007665 | 0.0523 | 0.439698 |  | 0.537898 | 2.440166 |  |  |
| VS | 0.875 | 2.0946 | 2.098789 |  | 1.504402 | 3.142751 |  |  |

TABLE 1-continued

Calculation of Section Modulus for Known Container Wall Section

|    | I (in⁴) | x (in) | A*x (in³) | $D_{centroid}$ (in) | $x_{centroid}$ (in) | $I_{centroid}$ (in⁴) | c (in) | Z (in³) |
|----|---------|--------|-----------|---------------------|---------------------|----------------------|--------|---------|
| VS | 0.875   | 2.0946 | 2.098789  |                     | 1.504402            | 3.142751             |        |         |
| VS | 0.875   | 2.0946 | 2.098789  |                     | 1.504402            | 3.142751             |        |         |
|    |         |        | 6.736065  | 0.590198            |                     | 11.86842             | 2.389402 | 4.967109 |

Table 2 below presents the data used to calculate the section modulus Z of the same container wall section, except in this example, the center vertical support is removed. This example illustrates the problem with removing a vertical support on a roll-off container to define an area in which indicia can be applied. In this example, because one of the vertical supports is removed, the total cross-sectional area is reduced to 10.4112 in². As shown, the section modulus Z is reduced from about 4.97 in³ in the first example to 3.36 in³ in the second example.

TABLE 2

Calculation of Section Modulus for Known Container Wall Section With One Vertical Support Removed

|    | I (in⁴)  | x (in)  | A*x (in³) | $D_{centroid}$ (in) | $x_{centroid}$ (in) | $I_{centroid}$ (in⁴) | c (in) | Z (in³) |
|----|----------|---------|-----------|---------------------|---------------------|----------------------|--------|---------|
| SW | 0.007665 | 0.0523  | 0.439698  |                     | 0.393111            | 1.306888             |        |         |
| VS | 0.875    | 2.0946  | 2.098789  |                     | 1.649189            | 3.600263             |        |         |
| VS | 0.875    | 2.0946  | 2.098789  |                     | 1.649189            | 3.600263             |        |         |
|    |          |         | 4.637276  | 0.445411            |                     | 8.507415             | 2.534189 | 3.357056 |

Table 3 below presents the data used to calculate the section modulus Z of the same container wall section, except in this example, an embodiment of assembly 150 is provided. In this case, the rib 156 of assembly 150 is a 3×3.5 #steel channel that is 1.38" in height. Its cross-sectional area was calculated to be 1.09 in². Also, the plate 166 of assembly 150 is formed of 12 gauge steel (thickness 0.1046") with a length of 72", yielding a cross-sectional area of 7.5312 in². The total cross-sectional area, including the areas of the side wall and two vertical supports described above, therefore is 19.0324 in². It is assumed that the plate 166 is spaced 1.38" from the container side wall.

TABLE 3

Calculation of Section Modulus for Container Wall Section Including Embodiment of Assembly 150

|       | I (in⁴)  | x (in)  | A*x (in³) | $D_{centroid}$ (in) | $x_{centroid}$ (in) | $I_{centroid}$ (in⁴) | c (in) | Z (in³) |
|-------|----------|---------|-----------|---------------------|---------------------|----------------------|--------|---------|
| SW    | 0.007665 | 0.0523  | 0.439698  |                     | 0.859161            | 6.213529             |        |         |
| VS    | 0.875    | 2.0946  | 2.098789  |                     | 1.183139            | 2.277616             |        |         |
| VS    | 0.875    | 2.0946  | 2.098789  |                     | 1.183139            | 2.277616             |        |         |
| Rib   | 0.17     | 1.0416  | 1.135344  |                     | 0.021231            | 0.170491             |        |         |
| Plate | 0.006867 | 1.5369  | 11.5747   |                     | 0.625439            | 2.952872             |        |         |
|       |          |         | 17.34732  | 0.911461            |                     | 13.89213             | 2.068139 | 6.717212 |

Therefore, it is seen that the section modulus Z is increased from about 4.97 in³ in the first example (and from 3.36 in³ in the second example) to about 6.72 in³ in a container having an embodiment of assembly 150. Again, the increased section modulus Z means that the bending stress in a container wall in some embodiments of the present invention will be less than in known containers for the same applied bending moment. Those of skill in the art will appreciate that the section modulus Z will be different for different implementations of and materials, sizes, etc. used in other embodiments of the present invention.

Although not required in all embodiments, in some embodiments panel 170 may be retained over plate 166 in a variety of ways. In this regard, FIGS. 19-23 are various views of a retainer assembly 200 and components thereof that may be used with embodiments of the present invention. With reference to these Figures, retainer assembly 200 in this embodiment comprises a hasp 202 pivotably coupled with a back plate 204.

More particularly, hasp 202 preferably is suitably connected for rotation with a pin 206, for example by welding. Pin 206 preferably is pivotally connected to back plate 204. For instance, in this embodiment retainer assembly 200 comprises a pair of hex nuts 208 disposed on back plate 204 and suitably connected therewith, again for example by welding. Pin 206 may be received for rotation within the apertures defined by hex nuts 208. Accordingly, hasp 202 may rotate with pin 206 with respect to back plate 202.

Referring in particular to FIGS. 21-23, hasp 202 preferably comprises a metal sheet bent into an "L" shape, with an upper portion 210 and a lower portion 212 extending at a right angle thereto. A tongue portion 214 coupled with lower portion 212 preferably extends downwardly at an obtuse angle relative to lower portion 212. In one embodiment, the obtuse angle may be about 100 degrees. As shown in FIGS. 19 and 21, when hasp 202 and pin 206 are coupled with hex nuts 208 of back plate 204, and when hasp 202 is rotated to a "closed" position at which upper portion 210 contacts back plate 204, upper portion 210 may be angled with respect to back plate 204, and tongue portion 214 may be substantially vertical in orientation. (As will be appreciated, hasp 202 can also be rotated relative to back plate 204 to an "open" position wherein upper portion 210 does not contact back plate 204.)

As best seen in FIGS. 8, 10, 13, and 15, in various embodiments one or more retainer assemblies 200 are preferably disposed on side wall 104. In these Figures, two retainer assemblies 200 are provided. In this regard, back plate 204 preferably comprises a rectangular mounting surface 216 having a lower edge 218. Back plate 204 also defines a flange 220 extending perpendicularly to mounting surface 216. In the illustrated embodiment, mounting surface 216 of back plate 204 is connected with (e.g., by welding or suitable fasteners) metal plate 114 of side wall 104. Lower edge 218 of back plate 204 mounting surface 216 preferably is disposed on an upper surface of upper frame member 152. Accordingly, when hasp 202 is rotated to the closed position described above, tongue portion 214 is positioned over panel 170. When hasp 202 is in this position, panel 170 may not be removed from the slot defined in assembly 150.

As described in more detail below, a suitable lock, such as a padlock, may be used to lock hasp 202 with back plate 204, thereby adding additional security to prevent removal of panel 170. In this regard, hasp 202 preferably comprises a round 222 defining an aperture 224 therethrough. Round 222 preferably extends between upper portion 210 and lower portion 212 of hasp 202, as best seen in FIG. 23. Additionally, back plate 204 preferably comprises a projection 226 defining an aperture 228 therethrough. Projection 226, which may be generally square in shape with a rounded corner, as best seen in FIG. 21, preferably extends perpendicularly from mounting surface 216. Projection 226 preferably is disposed on mounting surface 216 in a position at which projection 226 and round 222 are proximate or adjacent one another when hasp 202 is rotated to the closed position. Further, apertures 224, 226 may be in general alignment when hasp 202 is in the closed position. As a result, an operator may close hasp 202 and insert a suitable lock, such as a padlock, through apertures 224, 226 to prevent rotation of hasp 202 relative to back plate 204.

Additionally, in some embodiments, back plate 204 flange 220 may define one or more apertures 230, via which one end of a length of chain may be attached to flange 220. (See FIGS. 10 and 13). The other end of the chain may be coupled with the lock in a known manner. This may prevent theft of the lock used to secure panel 170. In one example embodiment, the lock may be coupled with flange 220 using the SavLok® kit offered by Hodge Products, Inc. of Houston, Tex.

In other embodiments, it is contemplated that many other methods and configurations may be used to retain or lock panel 170 on container 100. Those of skill in the art will appreciate that many other types of locking mechanisms may be used, including but not limited to gate-type locks, rotatable bars, movable bolts, rods, pins, and the like. Further, in various embodiments, retainer assemblies 200 may be provided on the sides of panel 170 (e.g., on vertical supports 122) or below panel 170 (e.g., on lower frame member 154), rather than above panel 170. In such embodiments, assembly 150 may define a slot analogous to that described above, but oriented to allow panel 170 to be "loaded" therein by sliding it in from the side or pushing it up from the bottom of assembly 150. Moreover, in some embodiments, angles 174, 176 may be disposed on all four sides of panel 170, such that panel 170 must be flexed or bowed to be received in a corresponding slot.

Alternatively, FIG. 24 is a schematic side view of a panel 250 disposed in a pivotable housing 252 according to another embodiment of the present invention. In this embodiment, housing 252 comprises a lower portion 254 and an upper portion 258 separated by one or more hinges 256. Hinges 256 preferably permit upper portion 258 to pivot relative to lower portion 254, which preferably is coupled with assembly 150, for example at lower frame member 154, between open and closed positions. Upper portion 258 of housing 252 may define a slot on the interior face thereof (not shown) to receive panel 250 and an aperture 260. The dimensions of aperture 260 are slightly smaller than those of panel 250 such that panel 250 is visible through aperture 260 but cannot pass therethrough. Again, in some embodiments, one or more retainer assemblies 200 or the like may be used to retain upper portion 258 in the closed position.

Accordingly, to load and/or replace a panel 250, an operator may unlock any apparatus securing upper portion 258 and then cause upper portion 258 to pivot downward relative to lower portion 254 about hinge(s) 256 from the closed position to the open position. The operator may then load and/or replace panel 250 in the slot defined in upper portion 258 of housing 252, and then the operator may return upper portion 258 to the closed position. As those of skill in the art will appreciate, in various embodiments of housing 252, hinge(s) 256 could be located on any side thereof. Thus, for example, instead of upper and lower portions 258, 254, housing 252 could be divided into left and right portions in some embodiments.

FIGS. 25-29 are various detail views of a refuse container 300 according to another embodiment of the present invention. In some respects, refuse container 300 may be analogous to refuse container 100, described in detail above. Accordingly, like parts are indicated by the same reference numerals used above. Certain differences between these embodiments are described below.

Turning first to FIGS. 25 and 28, in this embodiment upper frame member 152 and lower frame member 154 both comprise unitary pieces. A rib 302 extends between top rail 116 and bottom sill 118 (not shown). In this embodiment, rib 302 comprises three separate pieces, including an upper portion 304 extending between top rail 116 and upper frame member 152, a middle portion 306 extending between upper frame member 152 and lower frame member 154, and a lower portion 308 extending between lower frame member 154 and bottom sill 118. Upper and lower portions 304, 308 are formed from metal channels in this embodiment, and middle portion 306 may comprise a thinner metal angle (see FIG. 28).

Referring now also to FIGS. 26-27 and 29, in this embodiment plate 166 extends between a lower surface of upper frame member 152 and an upper surface of lower frame member 154. As such, no gap is needed between frame members 152, 154 and vertical supports 122 to receive flange 168. Rather, as shown in FIG. 29, each flange 168 may abut a vertical support 122 in this embodiment. Also, upper frame member 152 and lower frame member 154 are formed from the same material and have the same dimensions in this embodiment. As a result, plate 166 (and any panel 170 subsequently coupled therewith) is recessed with respect to the outer faces of frame members 152, 154 in this embodiment. This may provide greater protection for a panel 170 bearing indicia 172 thereon.

FIGS. 30-32 are various views of a container 400 according to another embodiment of the present invention. In some respects, container 400 may be analogous to container 100, described in detail above. Accordingly, like parts are indicated by the same reference numerals used above. Certain differences between these embodiments are described below.

In this embodiment, container 400 comprises an assembly 450 for receiving and/or supporting signage or other indicia. Assembly 450 is in some respects analogous to assembly 150, described in detail above, and again, like parts are indicated by the same reference numerals used above. In this embodiment, panel 170, which again is preferably removable, is retained in place using a pivotable border plate 452. More particularly, border plate 452 may comprise upper and lower horizontal segments 454, 456 coupled with a pair of vertical segments 458, 460 that together define an opening 462 through which panel 170 is visible. In various embodiments, segments 454, 456, 458, 460 may be formed of a suitable metal material. As best seen in FIG. 31, in this embodiment, segments 454, 456, 458, 460 comprise lengths of metal angle welded together. Although border plate 452 may take any suitable shape, in one preferred embodiment border plate 452 is rectangular in shape with outer peripheral dimensions that generally correspond to the dimensions of panel 170. Also, it will be appreciated that border plate 452 may be a unitary piece rather than formed of individual segments in some embodiments.

Border plate 452 preferably is pivotable between a first, or "closed," position, in which border plate 452 is disposed over and generally parallel with panel 170 (see FIG. 30), and a second, or "open," position, in which border plate 452 is spaced apart from panel 170 (see FIG. 32). In this regard, border plate 452 may be pivotably attached to container 100 and/or assembly 450 using any suitable method familiar to those of skill in the art, such as hinges. As shown, for example, border plate 452 is coupled with vertical support 122 via a pair of bullet hinges 464, 466.

The illustrated embodiment also includes a different retainer assembly embodiment than that described above. With reference in particular to FIG. 31, in this embodiment, a retainer assembly 470 comprises a pivotable bar 472 that can be moved from a first, "closed," position in which bar 472 is disposed over border plate 452 (e.g., over at least vertical segment 460 thereof) to retain border plate 452 in place with respect to panel 170, to a second, "open" position in which bar 472 is spaced apart from border plate 452 (see FIG. 32). In the latter position, border plate 452 may be opened, and panel 170 may be removed and/or a new panel may be inserted. Bar 472 preferably comprises a length of cylindrical metal tubing, which may or may not be hollow in various embodiments, but in other embodiments, other elongate metal structures may be used for bar 472 and/or bar 472 may have a cross-section that is other than square. For instance, in some embodiments, another length of metal angle could be used for bar 472. In any event, bar 472 may be pivotally attached to container 100 and/or assembly 450 using any suitable method familiar to those of skill in the art, such as hinges. As shown, for example, bar 472 is coupled with a vertical support 122 via a pair of bullet hinges 474, 476.

To accommodate pivotal movement of bar 472 in this embodiment, assembly 450 has a lower frame member 478 that is truncated, or shortened, in length on the side of bar 472. Likewise, a portion of lower horizontal segment 456 may also be truncated, or shortened. Also, as best seen in FIG. 31, a handle 480 preferably is attached to bar 472, for example proximate a distal end thereof. Handle 480 preferably extends generally perpendicularly to a longitudinal axis of bar 472 and may be pivotable about a hinged connection 482. When bar 472 is in the closed position, handle 480 may be secured in place by a pair of pivotable clasps 484, 486, each of which defines an aperture that aligns with the aperture of the other clasp when the clasps 484, 486 are brought into the position shown in FIG. 31. A lock may thus be used to lock clasps 484, 486 together and thereby lock handle 480 and bar 472 in place. Correspondingly, border plate 452 will be held in place over panel 170. In the illustrated embodiment, a carabiner is shown.

Based on the foregoing, it will be appreciated that embodiments of the invention provide improved containers and integrated signage assemblies therefor. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A container, comprising:
   a first side wall, a second side wall opposite the first side wall, a front wall coupled with the first and second side walls, a rear wall opposite the front wall and coupled with at least one of the first and second side walls, and a bottom wall coupled with at least the first and second side walls and the front wall;
   the first side wall, second side wall, front wall, rear wall, and bottom wall together defining an interior volume, the interior volume exceeding twenty (20) cubic yards;
   a plurality of vertical supports comprising at least a first vertical support and a second vertical support, the first and second vertical supports spaced apart along an exterior surface of at least one of the first side wall, second side wall, and front wall;
   a frame coupled with the exterior surface, the frame comprising:

a first horizontal frame member, the first horizontal frame member extending between the first and second vertical supports;

a second horizontal frame member spaced apart from the first horizontal frame member, the second horizontal frame member extending between the first and second vertical supports;

at least one rib extending along the exterior surface, wherein the rib extends from a lower peripheral edge of the exterior surface to the second horizontal frame member, from the second horizontal frame member to the first horizontal frame member, and from the first horizontal frame member to an upper peripheral edge of the exterior surface;

an area bounded by the first and second horizontal frame members and the first and second vertical supports; and a plate spaced apart from the exterior surface and extending across the area.

2. The container of claim 1, wherein the at least one rib comprises a plurality of ribs.

3. The container of claim 1, the rear wall comprising a door hingedly connected with one of the first and second side walls.

4. The container of claim 1, further comprising a top wall.

5. The container of claim 1, wherein the at least one rib comprises a metal channel.

6. The container of claim 1, wherein the plate covers at least one of the first and second horizontal frame members.

7. The container of claim 1, wherein the plate comprises a flange projecting orthogonally therefrom, the flange disposed along at least one peripheral edge of the plate.

8. The container of claim 7, wherein the flange is coupled with one of the first and second vertical supports.

9. The container of claim 1, further comprising indicia provided on the plate.

10. The container of claim 1, further comprising a panel removably coupled with the frame and disposed over the plate.

11. The container of claim 10, wherein the frame further comprises at least one slot sized to support the panel therein.

12. The container of claim 10, wherein the panel is coupled with the frame using fasteners.

13. An intermodal container, comprising:

first, second, and third side walls and an open end;

a bottom wall coupled with the first, second, and third side walls;

a door pivotably coupled to the container and movable between a first position at which the door is spaced apart from the at least one open end and a second position at which the door closes the at least one open end;

the first side wall comprising a plurality of vertical supports disposed on an exterior thereof, the plurality of vertical supports comprising a first vertical support, a second vertical support, and a third vertical support disposed between the first and second vertical supports;

a frame disposed between the first vertical support and the second vertical support of the plurality of vertical supports;

a plate coupled with the frame, the plate being parallel with and spaced apart from the exterior of the first side wall; and a panel removably coupled with the frame, the panel being parallel with the plate and covering at least a portion thereof.

14. The waste intermodal container of claim 13, further comprising indicia provided on the panel.

15. The intermodal container of claim 13, wherein the plate comprises a flange projecting orthogonally therefrom, the flange disposed along at least one peripheral edge of the plate.

16. The intermodal container of claim 13, wherein the container is an intermodal container.

17. The intermodal container of claim 13, wherein the frame comprises at least one rib extending vertically along the first side wall.

18. The intermodal container of claim 17, wherein the frame comprises a pair of spaced apart frame members extending horizontally between the first and second vertical supports of the plurality of vertical supports.

19. A container, comprising:

vertical side walls and a horizontal bottom wall coupled with the vertical side walls;

the vertical side walls and bottom wall together defining an interior volume of at least twenty (20) cubic yards;

at least one vertical side wall comprising an inner wall portion, an outer wall portion spaced apart from the inner wall portion, a top rail coupled with the inner wall portion, a bottom sill coupled with the inner wall portion, and a plurality of vertical supports coupled with the inner wall portion and extending between the top rail and the bottom sill, the plurality of vertical supports comprising a first vertical support, a second vertical support, and a third vertical support disposed between the first and second vertical supports;

the inner wall portion having a first surface area and the outer wall portion having a second surface area, wherein the second surface area is less than the first surface area;

a frame coupled with the inner wall portion and supporting the outer wall portion, the frame extending between the first and second vertical supports of the plurality of vertical supports, the top rail, and the bottom sill; and a panel supported by the frame and disposed on the outer wall portion.

20. The container of claim 19, wherein the panel is disposed within a slot defined by the frame.

21. The container of claim 19, the panel further comprising indicia.

22. The container of claim 19, wherein the outer wall portion is bounded laterally by the first and second vertical supports of the plurality of vertical supports.

23. The container of claim 22, wherein the outer wall portion extends vertically between spaced apart horizontal frame members of the frame, and wherein the third vertical support extends from the bottom sill to one of the spaced apart horizontal frame members and from the other of the spaced apart horizontal frame members to the top rail.

24. The container of claim 19, the frame comprising a pivotable border plate, the border plate moveable from a first position in which the border plate is disposed over the panel to a second position in which the border plate is spaced apart from the panel.

25. The container of claim 24, wherein the frame comprises a pivotable bar moveable from a first position in which the border plate is retained over the panel and a second position in which the border plate is moveable away from the panel.

* * * * *